United States Patent [19]
Lieber

[11] Patent Number: 5,189,298
[45] Date of Patent: Feb. 23, 1993

[54] MEASURING INSTRUMENT USING TWO TRANSMITTERS AND TWO RECEIVERS FOR MEASURING LIGHT TRAVELLING IN AN OPTICAL MEDIUM

[75] Inventor: Winfried Lieber, Krailling, Fed. Rep. of Germany

[73] Assignee: Siemens Aktiengesellschaft, Munich, Fed. Rep. of Germany

[21] Appl. No.: 783,413

[22] Filed: Oct. 28, 1991

[30] Foreign Application Priority Data

Nov. 13, 1990 [DE] Fed. Rep. of Germany ....... 4036106

[51] Int. Cl.$^5$ ............................................. H01J 5/16
[52] U.S. Cl. ........................... 250/227.16; 250/227.24; 385/48
[58] Field of Search .................... 250/227.16, 227.24; 356/73.1; 385/15, 24, 40, 48

[56] References Cited

U.S. PATENT DOCUMENTS

| | | |
|---|---|---|
| 4,652,123 | 3/1987 | Neumann . |
| 4,671,653 | 6/1987 | So et al. ........................ 250/227.16 |
| 5,062,703 | 11/1991 | Wong et al. ........................ 356/73.1 |
| 5,076,688 | 12/1991 | Bowen et al. ...................... 356/73.1 |
| 5,078,489 | 1/1992 | Lieber . |

Primary Examiner—David C. Nelms
Attorney, Agent, or Firm—Hill, Steadman & Simpson

[57] ABSTRACT

A measuring device for measuring light travelling through an optical medium with the device including two independent components, with each independent component including one transmitter and one receiver. Each of the components are connected via a flexible lead to a measuring and evaluation section of the measuring device in which an evaluation and/or display of the measuring signal obtained by the components will be produced.

15 Claims, 1 Drawing Sheet

MEASURING INSTRUMENT USING TWO TRANSMITTERS AND TWO RECEIVERS FOR MEASURING LIGHT TRAVELLING IN AN OPTICAL MEDIUM

BACKGROUND OF THE INVENTION

The present invention is directed to a measuring instrument for an optical medium, which instrument utilizes two optical transmitters and two optical receivers, with one optical receiver and transmitter being coupled to the optical medium on one side and the other receiver and transmitter being coupled to the medium on the opposite side.

Both allowed U.S. patent application Ser. No. 07/394,114, filed Aug. 15, 1989, which issued on Jan. 7, 1992 as U.S. Pat. No. 5,078,489, whose disclosure is incorporated herein by reference thereto, and which claims priority from German Application 38 28 604 as well as U.S. Pat. No. 4,652,123, whose disclosure is incorporated herein by reference thereto, disclose a measuring device which utilizes an optical transmitter and optical receiver means on one side of an optical medium to be measured and a transmitter and receiver means on the opposite side. In short, the measuring principle consists thereof that on one side of the optical medium, which may be in the shape of a light waveguide splice, a coupler or other passive optical component, an optical transmitter is connected, which couples its measuring signal in a light waveguide leading to the optical medium. From this first measuring transmitter, two measuring signals are obtained by means of two measuring receiver means, namely once before the optical medium and once after the optical medium. In the same way, an optical transmitter is then coupled to the other side of the optical medium and, again, a measuring of the reception signal is performed by means of the two receiver means, one located before the optical medium and the other following the optical medium. All in all, this operating mode, thus, requires two optical transmitters and two optical receivers. From the obtained test signal, it is possible to determine in exact fashion the attenuation of the optical medium in the manner described in the above-mentioned allowed U.S. application.

In many cases it is necessary to perform the measurement at the operating location, for example when splicing a light waveguide cable. This requires that the measuring instrument, as such, is fashioned to be transportable and that the requirement exists that the measuring operation can be performed by an operator as easily and as quickly as possible, whereby measuring results are to be obtained that can be reproduced as accurately as possible.

SUMMARY OF THE INVENTION

The present invention is directed to providing a measuring instrument which has two optical receiver means and two optical transmitters, which instrument enables the measuring operation to be performed by the operator as easily and as quickly as possible, whereby the measuring is also obtained that can be reproduced as accurately as possible.

To accomplish these goals, the present invention is directed to an improvement in a measuring instrument for an optical medium, which instrument uses two optical transmitters and two optical receiver means, which are coupled to the optical medium on both sides thereof. The improvements are that one optical transmitter and one optical receiver means are combined into one independent component and that these two components are connected via flexible leads with means for the measuring, evaluating and displaying the signals obtained by the components.

Since, respectively, one transmitter and one receiver means are combined into one independent component, it is not necessary that the operator works with altogether four units, namely two transmitters and two receiver means, but mechanically, all in all, only two components are available, which are, in each case, equipped in a double fashion, namely with one transmitter and one receiver means. Thus, since merely the two components must be coupled on, the connection of the measuring instruments on both sides of the optical medium to be measured is simplified to a considerable extent for the operator and, thus, it is already insured that all necessary measuring operations can be performed in a simple and reliable fashion.

Preferably, each of the components has a coupling device for the transmitter and a coupling device for the receiver means, which are fashioned so that they can be opened and closed. Preferably, these coupling devices are fashioned as bend couplers which are actuated together so that both the transmitter and the receiver means can be operated jointly. Preferably, each of the components has a handle and the handle contains actuating means for opening and closing the coupling device, as well as a flexible lead that extends from the handle of each of the components.

Other advantages and features of the invention will be readily apparent from the following description of the preferred embodiments, the drawings and claims.

DESCRIPTION OF THE PREFERRED EMBODIMENTS

Figure 1:
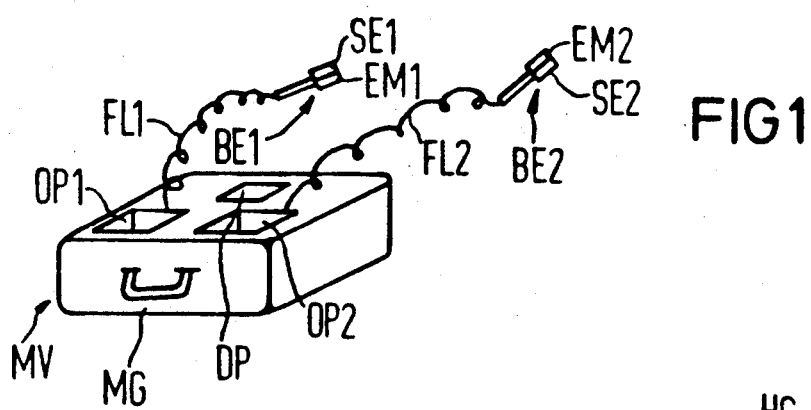
FIG. 1 is a perspective view of a measuring instrument in accordance with the present invention.

The principles of the present invention are particularly useful when incorporated in a measuring instrument, generally indicated at MV, which is illustrated in FIG. 1 as a case MG which contains measuring means or means for measuring, evaluating and displaying and this means includes a display DP for the measured readings on an upper surface of the case MG. Inside the case MG, the usual or conventional measuring and evaluation circuits of the measuring means are provided and will accomplish the measuring process which is performed by these circuits, according to the method disclosed in the above-mentioned allowed U.S. patent application Ser. No. 07/394,114.

In order to accomplish the measuring process, two optical transmitters and two optical receiver means are necessary. In this case, one optical receiver means and one optical transmitter are combined in mechanically independent components BE1 and BE2, respectively, wherein BE1 has the transmitting section SE1 and the receiver means or section EM1 and the component BE2 has a transmitting section SE2 and a receiver means or section EM2. The components BE1 and BE2 are connected with the evaluation circuit in the interior of the case MG by electrical lines, such as FL1 and FL2, respectively. In the upper surface of the case MG, two openings or recesses OP1 and OP2 are provided, into which the components, such as BE1 and BE2, can be plugged or laid in for transport position. For this, these openings OP1 and OP2 are to be dimensioned so that the connection leads FE1 and FE2, as well as the components BE1 and BE2, fit into the corresponding depressions. The measuring instrument MG can, additionally, have a lid, which is not shown, which will serve for the protection of the equipment attached on this upper surface.

Figure 2:
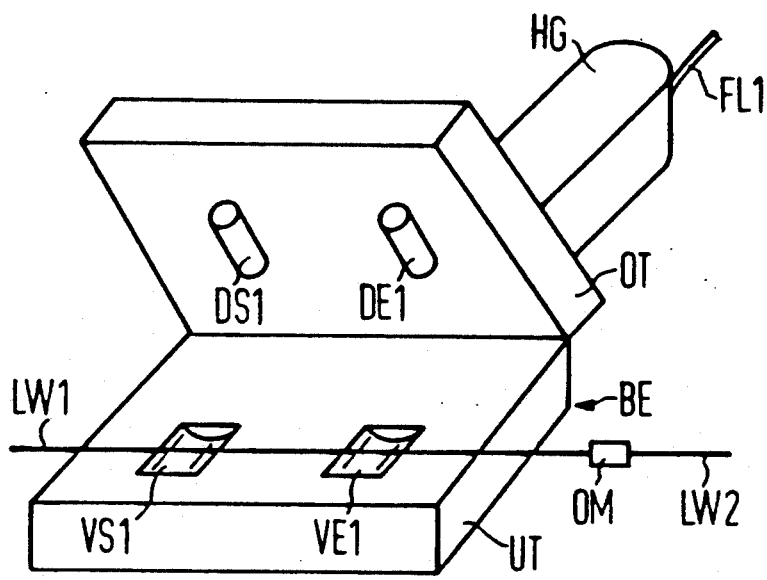
FIG. 2 is a perspective view of one of the independent components of the present invention in an opened condition.

Each of the components BE1 and BE2 are constructed as illustrated in the enlarged view of FIG. 2. Each component BE has a bottom part UT, which is fashioned in approximately a block shape and has two depressions VS1 and VE1 which will receive the light waveguide LW1, possibly in a guiding groove. This light waveguide LW1 will lead to an optical medium OM to be measured, for example a splice location, a coupler or a light wave-lead of a greater length. On the other end of the optical medium OM, another light waveguide LW2 is provided, to which the component BE2, according to FIG. 1, is coupled in an analogous manner for the measuring event.

Figure 3:
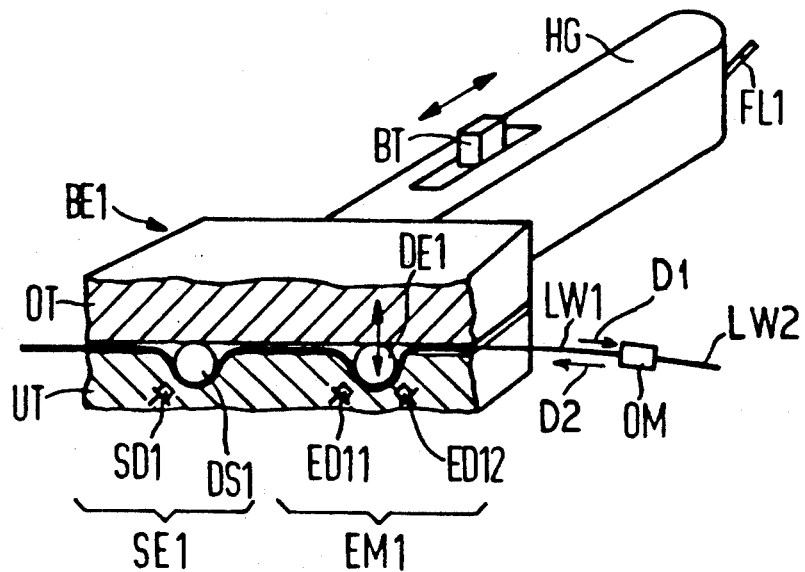
FIG. 3 is a perspective view of the component of FIG. 2 in a closed position with portions broken away for purposes of illustration.

An upper part OT is connected with the bottom part UT in a rotatable or pivotable fashion and has two pins or projections DS1 and DE1, which are arranged so that they will fit into the depressions VS1 or VE1, respectively, so as to press the light waveguide LW1 against the base or bottom of the depressions VS1 and VE1. In a closed condition, which is illustrated in FIG. 3, the curved results in the waveguide LW1 proceed in arc-shaped fashion so it is possible to couple light in and out of the light waveguide. As illustrated in FIG. 3, a transmitting diode SD1 is in the area of the pin DS1 and provides light, which is coupled into the waveguide LW1 and travels from left-to-right in the direction of arrow D1. In the area of the pin DE1, two reception diodes ED11 and ED12 are provided to form the receiver means EM1. The reception diode ED12 couples out light travelling in the direction D1, which comes from the transmitting diode SD1. The reception diode ED11 will couple out light coming from the right, as indicated by the arrow D2, which is from a transmitter of the component BE2, which is not shown in detail, and is positioned on the right side of the optical medium OM on the waveguide LW2. In any case, the connection must be performed so that the receiver EM1 or EM2 resides on the side facing the optical medium OM, whereas the transmitter SE1 or SE2 comes to reside on the side of the component BE1 not facing the optical medium OM.

In the case of the component BE2, the receiver EM2 and the transmitter SE2 are, thus, to be arranged in mirror symmetry, relative to that illustrated in FIGS. 2 and 3, so that the receiver EM2 will be located on the left side and the transmitter SE2 will be on the right side of the component BE2.

It is desirable to provide both of the components BE1 and BE2 with a handle, such as HG, wherein it is easily manageable for the operator and they can be connected to their respective light waveguides LW1 and LW2 easily. In this connection, it is also particularly advantageous to fashion or construct each of these components BE1 and BE2 as hand pliers, i.e., as a device whereby, by means of an actuation means BT in the area of the handle HG (see FIG. 3), the upper part OT can be moved between an opened position illustrated in FIG. 2 to a closed position, as illustrated in FIG. 3, relative to the bottom part UT. This means that the actuation of the device is as follows: The upper part OT is opened up by means of an actuation means BT to a position illustrated in FIG. 2, the light waveguide LW1 is then placed on the lower part UT over the depressions VS1 and VE1. Then, the upper part is shifted to the closed position, again by the actuating means BT, so that the projections or pins DS1 and DE1 engage the light waveguide LW1 and urge it in each of the depressions VS1 and VE1, respectively.

Although various minor modifications may be suggested by those versed in the art, it should be understood that I wish to embody within the scope of the patent granted hereon all such modifications as reasonably and properly come within the scope of my contribution to the art.

I claim:

1. In a measuring instrument for an optical medium, said instrument using two optical transmitters and two optical receiver means, which can be optically coupled to the optical medium on either side thereof, and includes means for measuring, evaluating and displaying signals from the receiver means, the improvements comprising one optical transmitter and one receiver means being combined into one component, the other optical transmitter and optical receiver means being combined into another component, said components being connected via flexible leads with said means for measuring, evaluating and displaying.

2. In a measuring instrument according to claim 1, wherein each of the components has an optical coupling device for the transmitter and receiver means, which is constructed so that it can be opened to receive an optical waveguide and closed to form an optical coupling with the waveguide.

3. In a measuring instrument according to claim 2, wherein the coupling device is constructed as a bending coupler, which bends the waveguide to form the optical coupling when in a closed position.

4. In a measuring instrument according to claim 3, wherein the coupling device for the transmitter and the coupling device for the receiver means are operated jointly together.

5. In a measuring instrument according to claim 4, wherein each of the components is provided with a handle.

6. In a measuring instrument according to claim 5, wherein each of the handles contains actuating means for opening and closing coupling elements of the coupling devices.

7. In a measuring instrument according to claim 6, wherein each handle, at it end, is provided with said flexible lead extending to said means.

8. In a measuring instrument according to claim 2, wherein the coupling device for the transmitter and the coupling device for the receiver means operate jointly.

9. In a measuring instrument according to claim 8, wherein each component is provided with a handle.

10. In a measuring instrument according to claim 9, wherein each of the handles includes actuating means for opening and closing the coupling device.

11. In a measuring instrument according to claim 10, wherein the end of each handle is connected to the means for measuring, evaluating and displaying by said flexible lead.

12. In a measuring instrument according to claim 1, wherein each of the components is provided with a handle.

13. In a measuring instrument for optical mediums, said instrument using two optical transmitter means; and two optical receiver means which are optically coupled to the optical medium on opposite sides thereof and includes measuring means for evaluating and displaying a signal received from each receiver means, the improvement comprising said instrument having two components, each component having one optical transmitter means and one optical receiver means connected via a flexible lead to said measuring means.

14. In a measuring instrument according to claim 13, wherein each of the components includes a pair of members movable between an opened position to a closed position, one of said members having a pair of depressions and the other of the members having a pair of projections extending into the depressions when the pair of members are in the closed position to cause a bending of a waveguide for purposes of coupling and uncoupling light therefrom.

15. In a measuring instrument according to claim 14, wherein one of said depressions has a light emitting element and the other depression is a receiver depression having two light receiving elements arranged to receive light travelling in the waveguide in both directions to form the receiver means.

* * * * *